United States Patent
Ryu et al.

(10) Patent No.: US 8,673,807 B2
(45) Date of Patent: Mar. 18, 2014

(54) CATALYST COMPOSITION FOR THE SYNTHESIS OF THIN MULTI-WALLED CARBON NANOTUBE

(75) Inventors: Sang-Hyo Ryu, Daejeon (KR); Wan Sung Lee, Daejeon (KR); Youngchan Jang, Daejeon (KR)

(73) Assignee: Korea Kumho Petrochemical Co., Ltd., Seoul (KR)

( * ) Notice: Subject to any disclaimer, the term of this patent is extended or adjusted under 35 U.S.C. 154(b) by 731 days.

(21) Appl. No.: 12/836,014

(22) Filed: Jul. 14, 2010

(65) Prior Publication Data

US 2012/0077031 A1   Mar. 29, 2012

(30) Foreign Application Priority Data

Dec. 22, 2009   (KR) .......................... 10-2009-0128632

(51) Int. Cl.
| | |
|---|---|
| *D01F 9/12* | (2006.01) |
| *D01F 9/127* | (2006.01) |
| *H01B 1/24* | (2006.01) |
| *B01J 21/18* | (2006.01) |
| *B32B 9/00* | (2006.01) |
| *B01J 21/10* | (2006.01) |
| *C09K 5/00* | (2006.01) |
| *B82Y 30/00* | (2011.01) |
| *B82B 1/00* | (2006.01) |
| *B82B 3/00* | (2006.01) |

(52) U.S. Cl.
USPC ........... 502/306; 502/324; 502/328; 252/511; 252/71; 977/742; 977/843; 977/902; 977/948; 977/952; 428/367; 423/447.3

(58) Field of Classification Search
USPC .................. 502/313–314, 306, 324, 328, 180; 428/367; 423/447.3, 447.1; 252/511, 252/71; 977/742, 843, 902, 948, 952
See application file for complete search history.

(56) References Cited

U.S. PATENT DOCUMENTS

| | | | |
|---|---|---|---|
| 5,165,909 A | | 11/1992 | Tennent et al. |
| 5,502,019 A | * | 3/1996 | Augustine et al. ............ 502/314 |
| 6,696,387 B1 | | 2/2004 | Moy et al. |
| 2007/0259974 A1 | * | 11/2007 | Lok et al. ...................... 518/715 |

FOREIGN PATENT DOCUMENTS

WO    WO2007033438 A1    3/2007

* cited by examiner

*Primary Examiner* — Daniel C McCracken
(74) *Attorney, Agent, or Firm* — Kenyon & Kenyon LLP

(57) ABSTRACT

The present invention relates to a catalyst composition for the synthesis of thin multi-walled carbon nanotube(MWCNT). More particularly, this invention relates to a multi-component metal catalyst composition comprising i) main catalyst of Co and Al, ii) inactive support of Mg and iii) optional co-catalyst at least one selected from Ni, Cr, Mn, Mo, W, Pb, Ti, Sn, or Cu. Further, the present invention affords thin multi-walled carbon nanotube having 5~20 nm of diameter and 100~10,000 of aspect ratio in a high yield.

4 Claims, 2 Drawing Sheets

CATALYST COMPOSITION FOR THE SYNTHESIS OF THIN MULTI-WALLED CARBON NANOTUBE

BACKGROUND OF THE INVENTION

1. Field of the Invention

The present invention relates to a catalyst composition for the synthesis of thin multi-walled carbon nanotube (MWCNT). More particularly, this invention relates to a multi-component metal catalyst composition comprising i) main catalyst of Co and Al, ii) inactive support of Mg and iii) optional co-catalyst at least one selected from Ni, Cr, Mn, Mo, W, Pb, Ti, Sn, or Cu. Further, the present invention affords thin multi-walled carbon nanotube having 5~20 nm of diameter and 100~10,000 of aspect ratio in a high yield.

2. Description of Prior Art

Carbon nanotube has a hexagonal honey comb shape in which one carbon atom is bonded with 3 adjacent carbon atoms. Further, the graphite plane is rolled in a round shape having nano size diameter. Specific physical properties are shown according to the size and shape of carbon nanotube. The weight of carbon nanotube is comparatively light due to its hollow structure. Further, the electrical conductivity is as good as that of copper, as well as the thermal conductivity is as good as that of diamond. Of course, the tensile strength is not less than that of iron. Carbon nanotube can be classified as single walled carbon nanotube, multi-walled carbon nanotube and rope carbon nanotube depending on its rolled shape.

Such carbon nanotube can be generally manufactured by an arc-discharge method, a laser vaporization method, a plasma enhanced chemical vapor deposition method, a thermal chemical vapor deposition method, a vapor phase growth method, or an electrolysis method. Among them, a thermal chemical vapor deposition method has been preferably used, because the growth of carbon nanotube can be made by the direct reaction between carbon source gas and metal catalyst without using the substrate. Further, high purity of carbon nanotube can be economically manufactured in a large amount according to a thermal chemical vapor deposition method.

In a thermal chemical vapor deposition method, the metal catalyst is necessarily required. Among the metals, Ni, Co, or Fe has been commonly used. Each particle of metal catalysts can act as seed for the formation of carbon nanotube. Therefore, the metal catalyst has been required to be formed as nano size particle. Of course, many researches for developing metal catalyst have been tried.

As a preparation method of metal catalyst reported until now, following preparation methods have been disclosed. First, the method comprising i) preparing the solution containing catalytic metals and support, ii) co-precipitating the catalyst composition by adjusting pH, temperature, and/or amount of ingredients, and iii) heat treating the precipitates under air or other gas atmosphere has been disclosed. Second, the method by drying or evaporating the suspension containing catalytic metal and fine grain support has been disclosed. Third, the method comprising i) ionizing the metal by mixing catalytic metal salt with cation particle support such as zeolite, and ii) reducing the ionized metal into metal particle by hydrogen or other reducing agent at high temperature has been disclosed. Fourth, the method by calcinating catalytic metal with solid oxide support material, such as, magnesia, alumina, and/or silica has been disclosed. Finally, the method of calcination for a metal composition has been disclosed where spray-drying of the catalytic metal precursor solution has been performed before calcination.

According to a catalytic chemical vapor deposition method, the metal catalytic components are slowly consumed in the process of synthesizing carbon nanotube. This consumption of metal catalytic components is caused by the inactivation of metal components by encapsulation, where carbon atoms encapsulate metal catalytic particles. Generally, re-activation of inactivated catalytic metal is neither possible, nor economical. In some cases, only few grams of carbon nanotube can be obtained using 1 gram of a metal catalyst composition including metal catalyst and support material. Therefore, the development of a highly active metal catalyst composition and of synthetic conditions has been required in order to produce the carbon nanotube in a commercially available scale Following technologies have been reported in patent disclosures or references until now.

According to U.S. Pat. No. 5,165,909 by Hyperion Catalysis International Inc., a method for producing carbon fibrils which comprises i) calcinating a catalyst composition at about 500° C. under air atmosphere after Fe catalyst is supported by $Al_2O_3$, ii) reducing the catalyst composition using hydrogen gas at about 900° C., and iii) preparing carbon fibrils by reacting benzene as a carbon source under hydrogen atmosphere at about 1,000° C. has been disclosed. However, the catalytic yield for preparing carbon fibril is not so good. Further, the process for preparing metal catalyst requires complicate steps of calcination and reduction as well as more than 800° C. of high reaction temperature.

To overcome such drawbacks of above patent disclosure, U.S. Pat. No. 6,696,387 disclosed the catalyst composition comprising i) Fe as main catalyst, ii) alumina and/or magnesia particle as catalyst support and iii) at least one optional co-catalyst selected from V, Nb, Ta, Cr, Mo, W, Mn, Tc, Re, Ru, Os, Co, Rh, Ir, Ni, Pd, Pt, or the lanthanides. However, it is hard to obtain a precise multi-walled carbon nanotube with a high catalytic yield using this catalyst composition, because the uniformed dispersion between metal catalyst and support material cannot be accomplished due to the use of alumina and/or magnesia support material.

In PCT publication No. WO 2007/33438, a catalyst system for multi-walled carbon nanotube production has been disclosed. In this disclosure, a catalyst system for the selective conversion of hydrocarbons into multi-walled carbon nanotubes and hydrogen comprising a compound of the formula: $(Ni, Co)Fe_yO_z(Al_2O_3)$, has been disclosed. Further, as preferred catalyst compositions, $CoFe_2O_4(Al_2O_3)_{4.5}$, $CoFe_2O_4 (Al_2O_3)_{16}$, and $CoFe_2O_4 (Al_2O_3)_{32}$ have been disclosed. Therefore, the catalyst composition comprising i) (Ni, Co) and Fe as main catalyst and ii) alumina as catalyst support has been disclosed. However, it is also hard to obtain a precise multi-walled carbon nanotube with a high catalytic yield using this catalyst composition, because the uniformed dispersion between metal catalyst and support material cannot be accomplished due to the use of alumina support material.

To overcome the low catalytic yield caused by non-uniformed dispersion of a catalyst composition, the inventors of present application have already disclosed a catalyst composition in U.S. patent application Ser. No. 12/472,925 'Catalyst composition for the synthesis of thin multi-walled carbon nanotube and its manufacturing method' filed on May 27, 2009.

In this U.S. patent application, a catalyst composition for producing carbon nanotube represented by following formula $[Fe_a:Al_b]_x:M_y:Mg_z$ has been disclosed. In this formula, Fe represents catalytic metal of iron, its oxide, or its derivative; Al represents catalytic metal of aluminum, its oxide, or its derivative; Mg represents inactive support of magnesium, its oxide, or its derivative; and M represents at least one transition metal selected from Co, Ni, Cr, Mn, Mo, W, V, Sn, or Cu, its oxide or its derivative.

Nevertheless, the inventors of present application have developed a highly uniformed and dispersed catalyst composition to enhance the catalytic yield by converting Fe into Co as main catalytic metal as well as by changing the ratio of Co and Al to accomplish the optimal molar fraction ratio. Further, all catalytic components containing inactive support material have been prepared using spray-drying, spray pyrolysis, or co-precipitation process in the aqueous solution.

Therefore, some drawbacks, such as, a low catalytic yield, pre-reduction of catalyst by using a hydrogen gas and non-uniformed dispersion of a catalyst composition have been solved by a novel catalyst composition and a preparation method of carbon nanotube using the same.

In the present application, the catalyst composition containing support material has been prepared using co-precipitation process in order to obtain a uniformly dispersed catalyst composition. Further, in the course of preparing a catalyst composition, a hydrogen reduction step has not been introduced. Finally, the inventors of present application have developed a multi-component metal catalyst composition comprising i) main catalyst of Co and Al, ii) inactive support of Mg and iii) optional co-catalyst at least one selected from Ni, Cr, Mn, Mo, W, Pb, Ti, Sn, or Cu. Further, the present invention affords thin multi-walled carbon nanotube having 5~20 nm of diameter and 100~10,000 of aspect ratio in a high yield.

SUMMARY OF THE INVENTION

The object of present invention is to provide a catalyst composition for producing carbon nanotube represented by following formula.

$$[Co_a:Al_b]_X:M_y:Mg_z$$

wherein

Co represents catalytic metal of cobalt, its oxide, or its derivative; Al represents catalytic metal of aluminum, its oxide, or its derivative;

Mg represents inactive support of magnesium, its oxide, or its derivative;

M represents at least one transition metal selected from Ni, Cr, Mn, Mo, W, Pb, Ti, Sn, or Cu, its oxide, or its derivative.

x, y, and z represent molar fraction of [the sum of Co and Al], M and Mg, x+y+z=10, 2.0≤x≤9.9, 0.0≤y≤2.5, 0.1≤z≤8.0.

a and b represent molar fraction of Co and Al, a+b=10, 4.0≤a≤8.0, 2.0≤b≤6.0.

Further, the molar fraction of [the sum of Co and Al], M, and Mg is preferably x+y+z=10, 3.0≤x≤9.5, 0.0≤y≤2.0, 0.5≤z≤7.0.

The molar fraction of Co and Al is preferably a+b=10, 4.5≤a≤7.5, 2.5≤b≤5.5.

The other object of the present invention is to provide a process for preparing a catalyst composition for synthesizing carbon nanotube comprising i) dissolving multi-component metal salts for the catalyst composition ($[Co_a:Al_b]_x:M_y:Mg_z$) in de-ionized water; ii) co-precipitating a multi-component catalyst composition by adding co-precipitating agent solution, spray-drying the solution containing the multi component metal salt, or spray pyrolysis of the solution containing the multi component metal salt; iii) filtering, drying, and milling the obtained co-precipitated catalyst composition; iv) calcinating the milled catalyst composition by thermal oxidation at 400~1,200° C.; and v) dried-milling and grinding the calcinated catalyst composition after thermal oxidation.

As metal salt, the form of nitrate, sulfate, alkoxide, carbonate, or chloride is preferred.

On the other hand, the further object of the present invention is to provide a process for preparing carbon nanotube comprising i) preparing a catalyst composition for the synthesis of carbon nanotube; ii) supplying mixed gas of hydrogen and at least one carbon source selected from saturated or unsaturated hydrocarbon having 1~4 carbon atoms to the reactor at 500~900° C.; and iii) growing and synthesizing carbon nanotube by thermal decomposition of supplied carbon source on the surface of a catalyst composition according to a thermal chemical vapor deposition method.

As reactor, vertical fixed-bed reactor, horizontal fixed-bed reactor, rotary kiln reactor, mobile bed reactor, or fluidized bed reactor can be used.

According to the method for preparing carbon nanotube, carbon nanotube having 5~20 nm of diameter and 100~10,000 of aspect ratio can be obtained.

The further object of present invention is to provide a method for using carbon nanotube as electrical conductive and strength enhanced fillers in polymer composite material, thermal conductive and strength enhanced fillers in metal composite, catalyst support of fuel cell, support material of organic process catalyst, storage material for methane and hydrogen gas, electrode material of lithium secondary battery, conductive material of lithium secondary battery, electrode material for high capacity electric double layer capacitor, field emitting material for display, and membrane material.

DETAILED DESCRIPTION OF THE INVENTION

Figure 1:
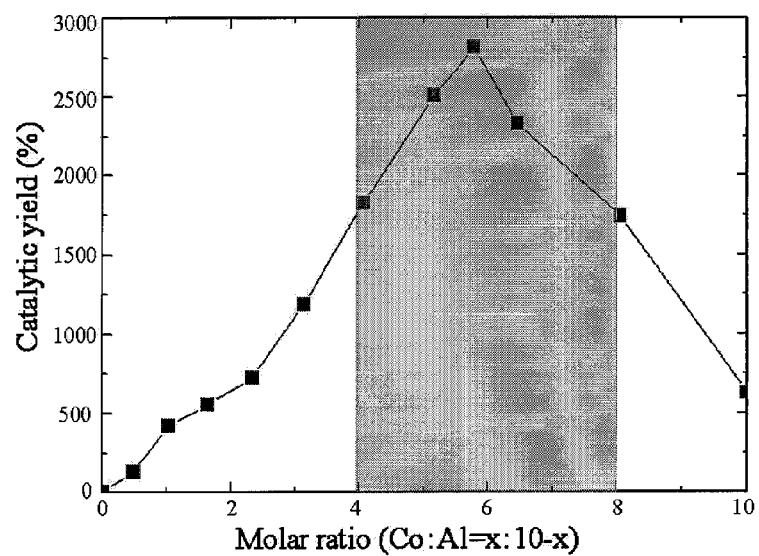
FIG. 1 shows a catalytic yield of a catalyst composition obtained in Example 1 and Comparative Example 1 of present invention according to the change of molar ratio between Co and Al.
Figure 2:
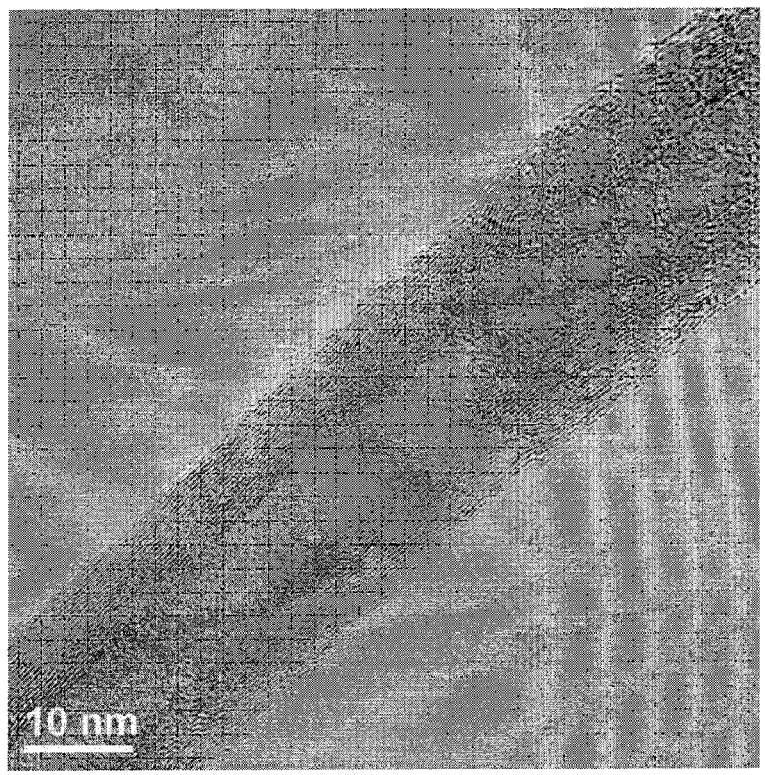
FIG. 2 shows a HR-TEM(Transmission Electron Microscope) photograph of carbon nanotube prepared in Example 1 of present invention.
Figure 3:
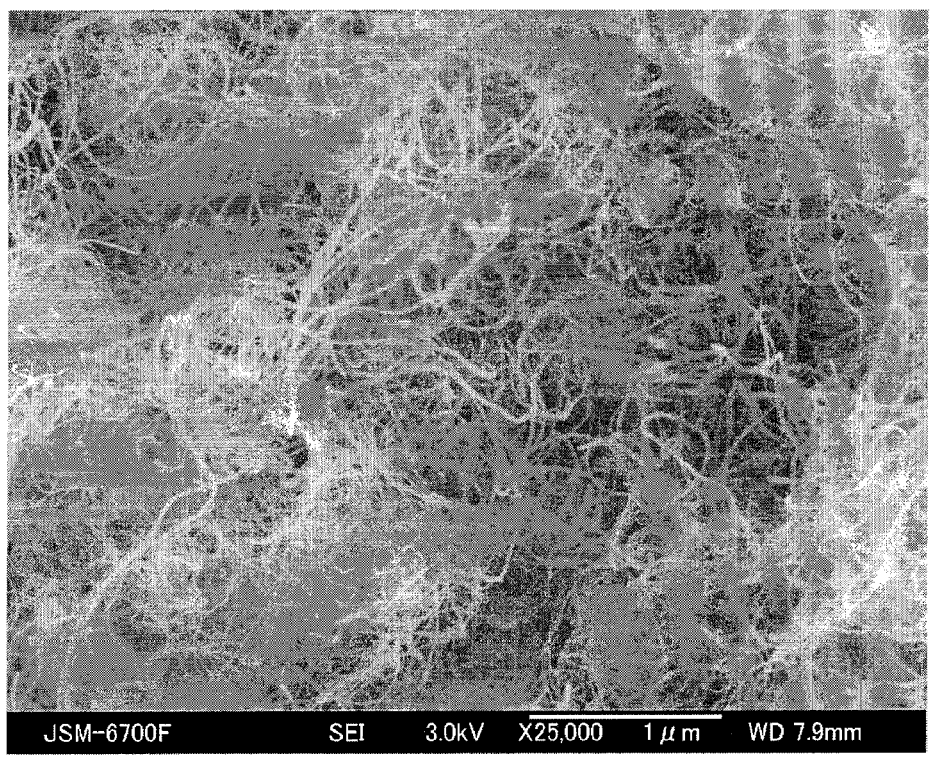
FIG. 3 shows a FE-SEM(Scanning Electron Microscope) photograph of carbon nanotube prepared in Example 1 of present invention.

Present invention relates to a catalyst composition for producing carbon nanotube represented by following formula.

$$[Co_a:Al_b]_x:M_y:Mg_z$$

wherein

Co represents catalytic metal of cobalt, its oxide, or its derivative; Al represents catalytic metal of aluminum, its oxide, or its derivative;

Mg represents inactive support of magnesium, its oxide, or its derivative;

M represents at least one transition metal selected from Ni, Cr, Mn, Mo, W, Pb, Ti, Sn, or Cu, its oxide, or its derivative.

x, y, and z represent molar fraction of [the sum of Co and Al], M, and Mg, x+y+z=10, 2.0≤x≤9.9, 0.0≤y≤2.5, 0.1≤z≤8.0.

a and b represent molar fraction of Co and Al, a+b=10, 4.0≤a≤8.0, 2.0≤b≤6.0.

Further, the molar fraction of [the sum of Co and Al], M, and Mg is preferably x+y+z=10, 3.0≤x≤9.5, 0.0≤y≤2.0, 0.5≤z≤7.0. The molar fraction of Co and Al is preferably a+b=10, 4.5≤a≤7.5, 2.5≤b≤5.5.

One of characteristics of the catalyst composition of present invention is to provide a uniformly dispersed catalyst composition comprising i) main catalyst of Co and Al, ii) inactive support of Mg and iii) optional co-catalyst at least one selected from Ni, Cr, Mn, Mo, W, Pb, Ti, Sn, or Cu. The catalyst composition can be prepared by i) co-precipitating a multi-component catalyst composition by adding co-precipitating agent solution, ii) spray-drying the solution containing the multi component metal salt, or iii) spray pyrolysis of the solution containing the multi component metal salt.

The other object of the present invention is to provide a process for preparing a catalyst composition for synthesizing carbon nanotube comprising i) dissolving multi-component metal salts for the catalyst composition ($[CO_a:Al_b]_x:M_y:Mg_z$) in de-ionized water; ii) co-precipitating a multi-component catalyst composition by adding co-precipitating agent solution, spray-drying the solution containing the multi component metal salt, or spray pyrolysis of the solution containing the multi component metal salt; iii) filtering and drying the obtained precipitated catalyst composition at 80~230° C. in the oven; iv) milling the dried catalyst composition; v) calcinating the milled catalyst composition by thermal oxidation at 400~1,200° C.; and vi) dried-grinding the calcinated catalyst composition after thermal oxidation.

As metal salt, the form of nitrate, sulfate, alkoxide, carbonate, or chloride is preferred.

For the preparation of carbon nanotube, the calcinated catalyst composition can be placed in the vertical or horizontal fixed-bed quartz furnace. Then, saturated or unsaturated hydrocarbon gas having 1~4 carbon atoms is supplied at 500~900° C. Carbon nanotube can be prepared on the surface of catalyst in a high yield. Various kinds of reactor can be used for preparing carbon nanotube. For example, vertical fixed-bed reactor, horizontal fixed-bed reactor, rotary kiln reactor, mobile bed reactor, or fluidized bed reactor can be used.

In a preparation method of carbon nanotube, the supply of a catalyst composition and the recovery of carbon nanotube can be carried out in a continuous or discontinuous process. For the synthesis of carbon nanotube, carbon source gas, such as, methane, ethane, propane, butane, ethylene, propylene, butene, or butadiene has to be supplied. Of course, hydrogen gas or inert gas can be supplied together with carbon source gas. The reaction can be performed under the pressure of 0.1~2 bar as well as at the temperature of 500~900° C. However, the reaction conditions have to be controlled to make a deposition of carbon in an appropriate rate without auto-decomposition of gas phase hydrocarbon. The preferred reaction temperature is 500~800° C.

The form of calcinated powder is preferred. After finishing synthesis of carbon nanotube, catalyst component in the carbon nanotube can be removed by a physical or a chemical method. For this purpose, the obtained carbon nanotube can be treated with acid or base as well as heat treatment at high temperature.

According to the preparation method of present invention, carbon nanotube having 5~20 nm of diameter can be prepared in the 3~5 times higher yields than the conventional method. Further, additional removal of catalyst in the carbon nanotube may not be required, because the obtained carbon nanotube of present invention shows very low level of remaining catalyst components in the carbon nanotube. However, the obtained carbon nanotube can be physically or chemically treated for introducing a functional group to the surface of carbon nanotube or burning impure carbon materials.

The obtained carbon nanotube of present invention can be used as electrical conductive and strength enhanced fillers in polymer composite material, thermal conductive and strength enhanced fillers in metal composite, catalyst support of fuel cell, support material of organic process catalyst, storage material for methane and hydrogen gas, electrode material of lithium secondary battery, conductive material of lithium secondary battery, electrode material for high capacity electric double layer capacitor, field emitting material for display, and membrane material.

The outstanding advantageous effect of present invention is to provide a multi-walled carbon nanotube having 5~20 nm of diameter and 100~40,000 of aspect ratio in a high yield. Further, the catalyst composition of present invention comprising i) main catalyst of Co and Al, ii) inactive support of Mg and iii) optional co-catalyst at least one selected from Ni, Cr, Mn, Mo, W, Pb, Ti, Sn, or Cu, thus enabling to prepare high purity multi-walled carbon nanotube in 3~5 times higher yields than the conventional method in a short period, such as, 30 minutes.

Further, the other outstanding advantageous effect of present invention is to provide a simple process for preparing a catalyst composition, wherein a hydrogen reduction step has not been introduced. Due to the simple preparation step of a catalyst composition and high catalytic yield of present invention, the production cost of carbon nanotube can be reduced. Further, the reduced cost for producing carbon nanotube affords that carbon nanotube can be applied in various fields in an economical manner.

The present invention can be explained more concretely by following Examples and Comparative Examples. However, the scope of the present invention shall not be limited by following Examples.

EXAMPLES

Example 1

Preparation of a Catalyst Composition with a Variation of the Molar Amount of Co and Al The catalyst composition consisting of Co, Al, and Mg without containing transition metal M has been prepared. The molar ratio of Co+Al/Mg is fixed as 7/3. Therefore, there is no transition metal M in this catalyst composition. After preparing a catalyst composition with a variation of the molar amount of Co and Al, carbon nanotubes have been prepared using these catalyst compositions. Catalytic yields have been measured for each of catalyst compositions.

The catalyst composition has been prepared as following methods. The solution containing a selected amount of $Co(NO_3)_2 \cdot 6H_2O$, $Al(NO_3)_3 \cdot 9H_2O$, and $Mg(NO_3)_2 \cdot 6H_2O$ in de-ionized water has been prepared. On the other hand, another solution containing a selected amount of ammonium bicarbonate in de-ionized water has been prepared as co-precipitating agent solution. The precipitation of a catalyst composition has been obtained by adding ammonium bicarbonate solution to the multi-component metal salts solution drop by drop with stirring for 60 minutes at room temperature. The obtained precipitated catalyst composition has been filtered using filter paper. Then, the obtained filter cake has been dried at 120° C. in the oven for 24 hours, followed by milling the cake using a dry type of high speed rotary mill. Then, the milled catalyst composition has been calcinated at 600° C. for 4 hours under air atmosphere for thermal oxidation. Finally, the obtained catalyst composition has been grinded again by a dry type of high speed rotary mill.

Carbon nanotube has been prepared using the obtained catalyst composition in fixed bed reactor in an experimental scale. A selected amount of a catalyst composition has been placed at the mid part of quartz furnace reactor. The reactor has been heated to the desired temperature under nitrogen atmosphere. Mixed gas of ethylene and hydrogen in a volume ratio of 4:1 has been supplied and flowed for the synthesis of carbon nanotube. After 1 hour of synthesis, an amount of multi-walled carbon nanotube has been prepared. The amount of carbon nanotube has been measured. The structure and shape of carbon nanotube have been analyzed using FE-SEM and HR-TEM analyses. The catalytic yield has been measured by following equation. Catalytic yield=$100 \times (M_{total} - M_{cat})/(M_{cat})$, wherein $M_{total}$ means the sum of the weight of carbon nanotube and catalyst, and $M_{cat}$ means the weight of catalyst.

Table 1 shows the synthesis of carbon nanotube using the catalyst composition prepared in Example 1. As shown in Table 1, carbon nanotube can be prepared in a high yield when the range of molar ratio of Co and Al is within Co 4.0≤a≤8.0 and Al 2.0≤b≤6.0 in case of a+b=10.

TABLE 1

The synthesis of carbon nanotube using the catalyst composition prepared in Example 1.

| catalyst composition | Catalyst amount (mg) | Reaction temp. (° C.) | amount of reaction gas (mL/minutes) | Reaction time (minutes) | Catalytic yield (%) |
|---|---|---|---|---|---|
| [Co:Al]:Mg = [7.95:2.05]:3 | 100 | 650 | $C_2H_4$:$H_2$ = 160:40 | 60 | 1,742 |
| [Co:Al]:Mg = [6.47:3.53]:3 | | | | | 2,326 |
| [Co:Al]:Mg = [5.79:4.21]:3 | | | | | 2,815 |
| [Co:Al]:Mg = [5.17:4.83]:3 | | | | | 2,508 |
| [Co:Al]:Mg = [4.07:5.93]:3 | | | | | 1,827 |

Remarks: The molar ratio of [Co + Al]:Mg is constantly 7:3 in all catalyst compositions.

Comparative Example 1

Preparation of a Catalyst Composition with a Variation of the Molar Amount of Co and Al The catalyst composition consisting of Co, Al and Mg without containing transition metal M has been prepared. The molar ratio of Co+Al/Mg is fixed as 7/3. Therefore, there is no transition metal M in this catalyst composition. After preparing a catalyst composition with a variation of the molar amount of Co and Al, carbon nanotubes have been prepared using these catalyst compositions. Catalytic yields have been measured for each of catalyst compositions.

Other conditions for preparing a catalyst composition are same as those shown in Example 1. Further, the conditions for preparing carbon nanotube are also same as those shown in Example 1. Of course, a catalytic yield has been measured using the same manner in Example 1.

Table 2 shows the synthesis of carbon nanotube using the catalyst composition prepared in Comparative Example 1. As shown in Table 2, carbon nanotube can not be prepared in a high yield when the range of molar ratio of Co and Al deviates from Co 4.0≤a≤8.0 and Al 2.0≤b≤6.0 in case of a+b=10.

Further, in the case that Co is not used in a catalyst composition, the catalytic yield is 0%. Therefore, it means that Al alone does not act as catalytic metal. In other words, Al has a role as co-catalyst of Co, because the catalytic yield of Co has been far enhanced in combination with Al.

and the molar fraction of Co and Al is 5.79:4.21. Further, various kinds of transition metal (M) has been used for catalyst compositions. The catalytic yield for each catalyst composition has been measured after preparation of carbon nanotube.

The catalyst composition has been prepared as following methods. The solution containing a selected amount of $Co(NO_3)_2 \cdot 6H_2O$, $Al(NO_3)_3 \cdot 9H_2O$, and $Mg(NO_3)_2 \cdot 6H_2O$ in de-ionized water and a selected amount of one compound selected from $Ni(NO_3)_2 \cdot 6H_2O$, $Cr(NO_3)_3 \cdot 9H_2O$, $Mn(NO_3)_4 \cdot 4H_2O$, $(NH_4)_6Mo_7O_{24} \cdot 4H_2O$, or $Cu(NO_3)_2 \cdot 3H_2O$ in de-ionized water has been prepared. On the other hand, another solution containing a selected amount of ammonium bicarbonate in de-ionized water has been prepared as co-precipitating agent solution. The precipitation of a catalyst composition has been obtained by adding ammonium bicarbonate solution to the multi-component metal salts solution drop by drop with stirring for 60 minutes at room temperature. The obtained precipitated catalyst composition has been filtered using filter paper. Then, the obtained filter cake has been dried at 120° C. in the oven for 24 hours, followed by milling the cake using a dry type of high speed rotary mill. Then, the milled catalyst composition has been calcinated at 600° C. for 4 hours under air atmosphere for thermal oxidation. Finally, the obtained catalyst composition has been grinded again using a dry type of high speed rotary mill.

Carbon nanotube has been prepared using the obtained catalyst composition in fixed bed reactor in an experimental scale. A selected amount of a catalyst composition has been placed at the mid part of quartz furnace reactor. The reactor

TABLE 2

The synthesis of carbon nanotube using the catalyst composition prepared in Comparative Example 1.

| Catalyst composition | Catalyst amount (mg) | Reaction temp. (° C.) | amount of reaction gas (mL/minutes) | Reaction time (minutes) | Catalytic yield (%) |
|---|---|---|---|---|---|
| [Co:Al]:Mg = [10:0]:3 | 100 | 650 | $C_2H_4$:$H_2$ = 160:40 | 60 | 628 |
| [Co:Al]:Mg = [3.14:6.86]:3 | | | | | 1185 |
| [Co:Al]:Mg = [2.34:7.66]:3 | | | | | 726 |
| [Co:Al]:Mg = [1.64:8.36]:3 | | | | | 556 |
| [Co:Al]:Mg = [1.03:8.97]:3 | | | | | 421 |
| [Co:Al]:Mg = [0.48:9.52]:3 | | | | | 127 |
| [Co:Al]:Mg = [0:10]:3 | | | | | 0 |

Remarks: The molar ratio of [Co + Al]:Mg is constantly 7:3 in all catalyst compositions.

Example 2

Catalyst Compositions for Preparing Carbon Nanotube

A catalyst composition comprising Co, Al, M (transition metal), and Mg has been prepared for the synthesis of carbon nanotube. The molar fraction of [Co+Al], M, and Mg is 6:1:3 has been heated to the desired temperature under nitrogen atmosphere. Mixed gas of hydrogen and one carbon source selected from ethylene and propane in a volume ratio of 1:4 has been supplied and flowed for the synthesis of carbon nanotube. After 1 hour of synthesis, an amount of multi-walled carbon nanotube has been prepared. The amount of carbon nanotube has been measured. The structure and shape of carbon nanotube have been analyzed using FE-SEM and HR-TEM analyses. The catalytic yield has been measured by following equation. Catalytic yield=100×($M_{total}$×$M_{cat}$)/($M_{cat}$), wherein $M_{total}$ means the sum of the weight of carbon nanotube and catalyst, and $M_{cat}$ means the weight of catalyst.

Table 3 shows the synthesis of carbon nanotube using the catalyst composition prepared in Example 2. As shown in Table 3, carbon nanotube can be prepared in a high yield regardless of the presence or the absence of the transition metal M when the range of the molar fraction of Co and Al is within Co 4.0≤a≤8.0 and Al 2.0≤b≤6.0 in case of a+b=10. However, if transition metal M is added to a catalyst composition, the catalytic yield has been enhanced somewhat in the range of 10~70% compared to that of the catalyst composition that does not contain transition metal M. Further, the catalyst composition of present invention can provide carbon nanotube in a high yield when using other carbon source such as propane.

Carbon nanotube has been prepared using the obtained catalyst composition in fixed bed reactor in an experimental scale. A selected amount of the catalyst composition has been placed at the mid part of quartz furnace reactor. The reactor has been heated to the desired temperature under nitrogen atmosphere. Mixed gas of ethylene and hydrogen in a volume ratio of 4:1 has been supplied and flowed for the synthesis of carbon nanotube. After 1 hour of synthesis, an amount of multi-walled carbon nanotube has been prepared. The amount of carbon nanotube has been measured. The structure and shape of carbon nanotube have been analyzed using FE-SEM and HR-TEM analyses. The catalytic yield has been measured by following equation. Catalytic yield=100×($M_{total}$−$M_{cat}$)/($M_{cat}$), wherein $M_{total}$ means the sum of the weight of carbon nanotube and catalyst, and $M_{cat}$ means the weight of catalyst.

TABLE 3

The synthesis of carbon nanotube using the catalyst composition prepared in Example 2.

| Catalyst composition | Catalyst amount (mg) | Reaction temp. (° C.) | amount of reaction gas (mL/minutes) | Reaction time (minutes) | Catalytic yield (%) |
|---|---|---|---|---|---|
| [Co:Al]:Ni:Mg = 6:1:3 | 100 | 650 | $C_2H_4$:$H_2$ = 160:40 | 60 | 3,068 |
| [Co:Al]:Cr:Mg = 6:1:3 | | | | | 3,517 |
| [Co:Al]:Mn:Mg = 6:1:3 | | | | | 3,420 |
| [Co:Al]:Mo:Mg = 6:1:3 | | | | | 4,509 |
| [Co:Al]:Cu:Mg = 6:1:3 | | | | | 4,799 |
| [Co:Al]:Mg = 2:8 | | | | | 2,025 |
| [Co:Al]:Mg = 7:3 | | 700 | $C_3H_8$:$H_2$ = 160:40 | | 4,362 |
| [Co:Al]:Mn:Mg = 6:1:3 | | | | | 4,244 |
| [Co:Al]:Mo:Mg = 6:1:3 | | | | | 4,167 |
| [Co:Al]:Cu:Mg = 6:1:3 | | | | | 5,020 |

Remarks: Molar fraction ratio between Co and Al is 5.79:4.21 to all catalyst compositions.

Comparative Example 2

Catalyst Compositions for Preparing Carbon Nanotube

Generally, Al(OH)$_3$, alumina or magnesia has been used as inactive support. Therefore, the catalyst composition having Co or Co+Al as a main catalyst and alumina or MgO powder as inactive support has been prepared. Then, carbon nanotube has been prepared using these catalyst compositions.

Further, we have also prepared a catalyst composition that does not contain Mg component, or containing an excess amount of transition metal M in order to measure the catalytic yield.

Table 4 shows the results of the synthesis of carbon nanotube using the catalyst composition prepared in Comparative Example 2. As shown in Table 4, the catalyst composition using conventional inactive support, such as alumina or MgO shows a very low (less than 430%) catalytic yield. Further, the catalyst composition that does not contain Mg component or containing an excess amount of transition metal M also shows a low catalytic yield compared to that of the catalyst composition of present invention. Even though the catalytic yield shows more than 1,000% in case of using an excess amount of transition M, the yield is still less than half of the yield of the catalyst composition of present invention.

TABLE 4

The synthesis of carbon nanotube using the catalyst composition prepared in Comparative Example 2.

| Catalyst composition | Reaction Conditions | Catalytic yield (%) | Remarks |
|---|---|---|---|
| [Co:Al$_2$O$_3$]:MgO = 4.2:2.8:3 | Catalyst amount (mg): 100 | 352 | Al$_2$O$_3$ or MgO is used |
| Co:Al$_2$O$_3$ = 6:4 | Reaction temp. (° C.): 600 | 430 | as inactive support as |
| [Co:Al]:MgO = 4.1:2.9:3 | Amount of reaction gas (mL/minute): $C_2H_4$:$H_2$ = 160:40 | 140 | shown in other conventional methods |
| Co:Al = 5.79:4.21 | Reaction time (minutes): 60 | 840 | Catalyst composition is prepared in the absence of Mg |
| [Co:Al]:Mn:Mg = 1.7:1.3:4:3 | | 1,037 | An excess amount of transition metal M is used |
| [Co:Al]:Mo:Mg = 1.7:1.3:4:3 | | 1,206 | |

What is claimed is:

1. A catalyst composition for synthesis of carbon nanotube represented by following formula:

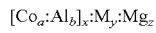

wherein

Co represents catalytic metal of cobalt, its oxide, or its derivative; Al represents catalytic metal of aluminum, its oxide, or its derivative;

Mg represents inactive support of magnesium, its oxide, or its derivative;

M represents at least one transition metal selected from Ni, Cr, Mn, Mo, W, Pb, Ti, Sn, or Cu, its oxide, or its derivative;

x, y, and z represent molar fraction of [the sum of Co and Al], M, and Mg, $x+y+z=10$, $2.0 < x < 9.9$, $0.0 < y < 2.5$, $0.1 < z < 8.0$;

a and b represent molar fraction of Co and Al, $a+b=10$, $4.0 < a < 8.0$, $2.0 < b < 6.0$.

2. The catalyst composition for synthesis of carbon nanotube according to claim 1, wherein the molar fraction of [the sum of Co and Al], M, and Mg is $x+y+z=10$, $3.0 < x < 9.5$, $0.0 < y < 2.0$, $0.5 < z < 7.0$, and the molar fraction of Co and Al is $a+b=10$, $4.5 < a < 7.5$, $2.5 < b < 5.5$.

3. A process for preparing carbon nanotube comprising i) preparing a catalyst composition for the synthesis of carbon nanotube of claim 1; ii) supplying mixed gas of hydrogen and at least one carbon source selected from saturated or unsaturated hydrocarbon having 1~4 carbon atoms to the reactor at 500~900° C.; and iii) growing and synthesizing carbon nanotube by thermal decomposition of supplied carbon source on the surface of a catalyst composition according to a thermal chemical vapor deposition method.

4. The process for preparing carbon nanotube according to claim 3, wherein vertical fixed-bed reactor, horizontal fixed-bed reactor, rotary kiln reactor, mobile bed reactor, or fluidized bed reactor can be used as reactor.

* * * * *

UNITED STATES PATENT AND TRADEMARK OFFICE
CERTIFICATE OF CORRECTION

PATENT NO. : 8,673,807 B2
APPLICATION NO. : 12/836014
DATED : March 18, 2014
INVENTOR(S) : Sang-Hyo Ryu et al.

It is certified that error appears in the above-identified patent and that said Letters Patent is hereby corrected as shown below:

IN THE CLAIMS:

At column 11, line 16, change "$x + y + z = 10$, $2.0 < x < 9.9$," to -- $x + y + z = 10$, $2.0 \leq x \leq 9.9$, --.

At column 11, line 16, change "$0.0 < y < 2.5$, $0.1 < z < 8.0$;" to -- $0.0 \leq y \leq 2.5$, $0.1 \leq z \leq 8.0$; --.

At column 11, line 18, change "$a + b = 10$, $4.0 < a < 8.0$, $2.0 < b < 6.0$" to -- $a + b = 10$, $4.0 \leq a \leq 8.0$, $2.0 \leq b \leq 6.0$ --.

At column 12, line 3, change "$x + y + z = 10$, $3.0 < x < 9.5$, $0.0$" to -- $x + y + z = 10$, $3.0 \leq x \leq 9.5$, $0.0$ --.

At column 12, line 4, change "$< y < 2.0$, $0.5 < z < 7.0$," to -- $\leq y \leq 2.0$, $0.5 \leq z \leq 7.0$, --.

At column 12, line 5, change "$4.5 < a < 7.5$, $2.5 < b < 5.5$" to -- $4.5 \leq a \leq 7.5$, $2.5 \leq b \leq 5.5$ --.

Signed and Sealed this
Second Day of December, 2014

Michelle K. Lee
*Deputy Director of the United States Patent and Trademark Office*